United States Patent
Xiao et al.

(10) Patent No.: US 7,293,213 B1
(45) Date of Patent: Nov. 6, 2007

(54) METHOD FOR DETECTING SOFTWARE ERRORS AND VULNERABILITIES

(75) Inventors: Zhen Xiao, Randolph, NJ (US); Christof Fetzer, Dresden (DE)

(73) Assignee: AT&T Corp., New York, NY (US)

( * ) Notice: Subject to any disclaimer, the term of this patent is extended or adjusted under 35 U.S.C. 154(b) by 247 days.

(21) Appl. No.: 11/214,420

(22) Filed: Aug. 29, 2005

Related U.S. Application Data

(60) Provisional application No. 60/611,014, filed on Sep. 16, 2004.

(51) Int. Cl.
*G06F 11/00* (2006.01)
(52) U.S. Cl. ...................... 714/741; 717/124
(58) Field of Classification Search ............... 710/200; 714/38, 741; 717/125, 124
See application file for complete search history.

(56) References Cited

U.S. PATENT DOCUMENTS

| | | | |
|---|---|---|---|
| 5,481,706 A | * | 1/1996 | Peek ..................... 710/200 |
| 6,378,087 B1 | * | 4/2002 | Flanagan et al. ............. 714/38 |
| 6,591,413 B1 | * | 7/2003 | Humphrey et al. ......... 717/125 |
| 6,832,302 B1 | | 12/2004 | Fetzer et al. |
| 6,973,643 B2 | * | 12/2005 | Goldsmith et al. ......... 717/124 |
| 7,225,428 B1 | * | 5/2007 | Fetzer et al. ................ 717/124 |

* cited by examiner

*Primary Examiner*—David Ton
(74) *Attorney, Agent, or Firm*—Buskop Law Group, PC

(57) ABSTRACT

The present embodiments provide methods for detecting errors and vulnerabilities in software without access to its source code. The method entails extracting functions from dynamically linked applications, determining error return codes and error numbers for the extracted functions, and forming a wrapper using the extracted functions. The wrapper is used to intercept some of the function calls, wherein the intercepted functions are manipulated to fail. The embodiments further relate to an article of manufacture to detect errors. The article of manufacture utilizes an extraction module to extract functions from dynamically linked applications, software to compile error return codes and error numbers for functions, and a wrapper module to form a wrapper with the extracted functions.

14 Claims, No Drawings

METHOD FOR DETECTING SOFTWARE ERRORS AND VULNERABILITIES

CROSS REFERENCE TO RELATED APPLICATIONS

The present application claims priority to co-pending U.S. Provisional Patent Application Ser. No. 60/611,014 filed on Sep. 16, 2004.

FIELD

The present embodiments relate generally to methods, wrappers, and articles of manufacture that can be used for detecting errors in software without the need for source code.

BACKGROUND

A subtle programming error in a commonly used application can sometimes become a serious security hole if exploited by malicious users. A traditional approach for detecting programming errors has been to visually examine the source code to detect loopholes. Manual inspection of the source code, however, is tedious and expensive in human costs and very time consuming when applied to systems that are very large. Moreover, traditional manual inspections can be erratic and depend largely on the level of expertise of the software engineers involved.

Additionally, most bugs in the software are contained in the error handling paths. Normal execution paths are usually well tested, but detection of bugs in the error handling path has been largely overlooked. Sometimes such bugs are difficult to detect or reproduce because they happen rarely, such as, only when resources of the system are depleted, like memory resources. Additionally, other errors in the program may have a delayed effect, for example, a buffer overflow may lead to heap corruption and cause a system crash much later. Thus, a need exists for a method to evaluate the robustness of the software and detect its potential errors and vulnerabilities in an effective manner.

Moreover, manual inspection requires access to the source code of the software. With the increasing pressure of cutting down the business cost, many companies utilize software products developed by third party vendors. Source code access is typically not available in this case.

One approach that has been used in the past is to use black box testing which passes various input values into the software and checks its output. Traditionally black box testing methods do not adequately test the behavior of the software on exceptional system conditions, such as when the system runs out of file descriptors.

A need exists for a way of exposing a large number of software bugs without source code access.

A need exists for an automatic process, which eliminates the manual methods for detecting errors in software.

A need exists for a method to detect programming errors in large software systems quickly.

The present embodiments meet these needs.

SUMMARY

The present embodiments provide methods for detecting programming errors in large software systems which traditionally has been very difficult. The present embodiments provide methods for detecting errors and vulnerabilities in software without access to its source code. The embodied methods and articles can expose a large number of software bugs in various execution environments efficiently. The embodied methods and articles can be applied by users with limited domain specific knowledge about the software.

The embodied methods for detecting errors in software begin by extracting functions from dynamically linked applications and determining error return codes and error numbers for the extracted functions. One or more wrappers are formed using the extracted functions. Software is executed in association with the wrapper to intercept some of the function calls. The intercepted function calls are manipulated to fail. The methods end by testing if the dynamically linked applications will operate when the failure occurs.

An embodied article of manufacture utilizes an extraction module for extracting function from dynamically linked applications. Software on the article compiles error return codes and error numbers for functions. A wrapper module forms one or more wrappers with the extracted functions. The wrapper detects errors in software. The wrapper tracks error return codes and error numbers; tracks extracted functions from an application; intercepts function calls for the application; and manipulates intercepted function calls to cause the function calls to fail and determine if the application will operate when failure occurs. The intercept function calls are from an application are tested using one or more wrappers.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments provide methods for detecting errors and vulnerabilities in software without access to its source code. The embodied methods and articles can expose a large number of software bugs in various execution environments efficiently. The embodied methods and articles can be applied by users with limited domain specific knowledge about the software.

The embodied methods and articles can be used to simulate the effect of various system failures by manipulating the return values of the function calls in the software. The present embodiments provide a deterministic method to test the error handling capability of the software during exceptional or stressful situations.

An embodiment involves a method that extracts a list of library functions linked to an application and, then, computes the error return code and error number for each of the functions extracted. Subsequently, the embodiments evaluate the error handling capability of the application by selectively causing some of the function calls to return error codes.

The present embodiments determine the error handling capability of the application by instrumenting some of the function calls to return error codes. C functions typically return a unique error code, such as "−1" or "Null", to indicate that an error has occurred. Many functions set the variable errno to specify the reason of the error. For example, the malloc function returns a NULL pointer and sets the variable errno to ENOMEM when the system runs out of memory.

The embodied methods and articles enable detection of error by manipulating error codes after intercepting functions with a wrapper. The wrapper envelopes certain library functions. The wrappers intercept calls to the function then determine whether any of the inputs to the function were invalid. Descriptions of such wrappers may be found in the article.

As an example, a Unix systems standard tool like objdump can be used to extract the list of library functions linked to an application. An example software architecture that incorporates wrappers generated in accordance with the present invention to intercept extracted functions. The run time architecture of one or more user applications can employ one or more functions of one or more libraries with functions.

Once the functions have been extracted, the arguments for each function are determined. The types of any arguments employed in library function call are identified. The types of arguments for a function can be determined from text descriptions of the library functions. All library functions must have some descriptions or application developers would not be able to use the functions.

The determination of argument types may be automated in C++ libraries where the function name and argument type are encoded in each function's symbol name. Accordingly, for C++ libraries, the processor may be programmed to extract the function name and type of information from the symbol name of each function.

Wrapper is generated logically interposed between the user applications and the library with functions. The wrapper is generated after the diagnosis of the error codes.

The software architecture can be implemented in code executed by one or more computing devices. An example exemplary computing arrangement includes a processing circuit, a display, a set of input devices, and storage elements. The computing arrangement can be suitably integrated into a single general purpose computer, such as a commercially available computer available from Dell Computer Corporation. Alternatively, the computer device can be implemented as a plurality of computing devices arranged in a local area network, an enterprise wide network or an internet network.

The processing circuit can include one or more processing devices and related support circuitry. Multiple processing devices may be enclosed within a single general purpose computer or distributed over several computers in a network setting. A processing device of the processing circuit may suitably comprise a Pentium™ type microprocessor available from Intel Corporation.

The display can be one or more suitable displays operable to give human perceptible output. To this end, the display can comprise a CRT display, an LCD display, a plasma display, or even a haptic display. The input devices can comprise one or more devices operable to provide user input to a computer. Examples of these devices include alphanumeric keyboards, and keypads, mice light pens, other point devices, and even microphones. The input devices can include communication interfaces connected to other computing devices, not shown, but which are well known in the art.

The storage elements can include a variety of data storage devices accessible to the processing device, including random access memory, read-only memory, flash programmable memory, hard disk, removable compact disk, floppy disk, tape devices, and any combinations of the foregoing.

A code for one or more of the user applications and the wrapper and the library are suitably stored within the storage elements. If the computing arrangement is implemented as a network, the code for the user applications, the library with functions, and the wrapper can be distributed over multiple physical storage elements. Those of ordinary skill in the art may readily devise their own implementation details. Any suitable implementation of a shared C library can be used with the wrapper implemented in a manner similar to the C library.

The user applications and can be any applications that employ functions from the library. An embodiment contemplated herein uses a shared C language library as the library that contains C or C++ programs. The functions of the library can be commercial off the shelf libraries such as, the glibc 2.2 library available from RedHat Linux.

The present embodiments extract the list of library functions linked to the applications. With these embodiments, an automated approach extracts the prototypes of these functions and then conducts adaptive fault injection experiments based on those prototypes. The prototype of a function contains the C type of all the arguments and the return types of the function. For the malloc function, the argument type is size_t and its return type is void *.

Extracting C prototypes of functions in the C libraries is non-trivial. By parsing header files that contain the prototypes of the global functions, a proper set of header files can be formed with the definition of a function type.

Each wrapper has numerous codes configured to cause the processing circuit to intercept a function call to a corresponding library function from the library. The function call can include at least one argument that represents a value from the user application that is passed to the library function for use during execution of the library function. For example, the function call asctime(tm) calls the function asctime from the glibc2.2 with the argument tm. The argument tm is a pointer to the structure that represents a current time value.

The wrapper is formed after the prototypes of the library functions have been extracted and the fault injection experiments are completed.

A fault injection test is used to automatically inject test data structures into the library function to determine a set of data structure types that do not cause faults when used as an argument passed to that function. In the embodiment described herein, the processor performs a partially predetermined set of fault injection tests. The system can generate a fault-injector program for each function. The fault injector calls the function with a sequence of test cases that contain normal and exceptional values. The test cases are generated by a set of test case generators based on the argument types of the function. For functions with multiple arguments, the set of test cases is the cross product of the test cases for each argument.

A test case generator can be used to test multiple C types, as long as multiple C types can be casted to the same basic type. For example, the arguments for function asctime and function ctime are const struct tm * and const time_t *, respectively. Both of the functions can be casted to the generic pointer type (i.e. void *) and can be handled by the test case generator for fixed size arrays. Alternatively, multiple test case generators can be used to test a single argument.

EXAMPLE

Test Case Generator for Fixed Size Arrays

Fixed size arrays can be used to represent pointers to structures. For example, the argument for the asctime function described above is an array of bytes that contains the tm structure. The function exhibits robust violations if the array pointed to by its argument is not readable or does not have enough space.

TABLE 1

| TYPE | Description |
| --- | --- |
| NULL | the Null Pointer |
| RONLY_FIXED[s] | Readable array of s bytes |
| WONLY_FIXED[s] | Writable array of s bytes |
| RW_FIXED[s] | Readable/writable array of s bytes |
| STRING | Null-terminated string |

The size of the structure is determined dynamically using fault-injection experiments. The test cases generator for void* allocates an array of a specific size at a page boundary. The test cases generator places a read and write protected memory page after the array to ensure that any access beyond the boundary of the allocated array generates a segmentation fault. The test case generator can allocate arrays with different memory protection mechanisms as shown in Table 1. If a segmentation fault occurs, the test case generator checks the address of the segmentation fault to see how it should adjust its test case to prevent this fault. The test case generator can change the type of the array (for example, from a readable array to a writable array), null-terminate the array, or increase the size of the array.

As an example, in order to determine the robust argument type for asctime (const struct tm *tm), the test case generator first allocates an array of zero size, thereby generating a segmentation fault during the test. The test case generator iteratively enlarges the array until no more segmentation faults occur or until a maximum size is reached.

EXAMPLE

Determining Error Return Code

Evaluation of the error handling capability of an application is done by instrumenting some of the function calls to return errors. The evaluation requires the error return code and errno of these functions to be known. This information can be extracted in two ways. The first way is to parse the manual page of a function. Most manual pages have a "RETURN VALUE" section that describes the return values of the function under various conditions and an "ERRORS" section that describes the list of possible errors. Due to the uniform format of manual pages, parsing the manual pages to extract the information needed is straightforward. One problem that can be encountered is that sometimes a manual page defines multiple functions. In this case, the script needs to analyze carefully the sentences in the manual page to make sure the script extracts the information for the right function. In addition, sometimes the manual page of a function does not describe the error return code even if the function can fail. The second approach used to determine the error return code of a function is through adaptive fault injection experiments. If a test case does not result in a crash and the function sets errno, the error return code is recorded. Experience indicates that this approach can be more applicable than parsing manual pages. A problem encountered can be that a small number of functions did not set errno when tested with invalid input values, even though the functions correctly returned the error code specified in the manuals.

EXAMPLE

Application Fault-Injector

Evaluation of the error handling capability of the application can be achieved by selectively instrumenting some of its function calls to return error codes, thereby providing a deterministic way to simulate the effect of various system failures. For example, instrumenting the malloc function to return NULL with errno=ENOMEM simulates the depletion of system memory. Simulating disk full can be achieved by instrumenting the write function to return −1 with errno=ENOSPC.

A dynamically loadable wrapper can be used to intercept every function call made by the application to the library. In this embodiment, the wrapper is given a higher priority than the standard library in resolving undefined symbols in the application.

When an application performs a library function call, the application invokes the version of the function in a wrapper. The fault-injector for this application can then decide whether to allow the function call to complete normally or to return an error using the error return code and errno computed previously. The wrapper can monitor the behavior of the application to see if the application exhibits any robustness violation. The application can use a signal handler to catch segmentation faults from the application. A memory protected page can be inserted after each buffer allocated. In this way, a buffer overflow will cause a segment violation. Memory that has been released is memory protected to detect access to already freed memory.

When a robustness violation is detected in a fault injection experiment, the system traces the execution to determine which error return codes are not handled properly by the application. The error return code of a function can cause a robustness violation only in a particular context. For example, a segmentation fault can occur when the malloc function returns NULL, but only if malloc is called by a user-defined function $f$, such information was automatically recorded in a log. The quality of the fault-injection experiments depend on the workloads used. After the security vulnerability of an application has been discovered, the exploited scripts can be used as workloads.

By manipulating the intercepted function calls from the wrapper to fail while using the error return code, a user is enabled to determine if the application will operate when the failure occurs. This sequence of events, using the wrapper and then manipulating the functions to fail, enables the reliability of the applications to be tested and the bugs in large scale programs to be detected.

The present embodiments can be carried out at least in part by one or more processors using corresponding code stored in a storage element. The processor can be a processor within the processing circuit using code stored in one or more storage elements, such as the storage elements. The processor and storage elements can be disposed in a different computing device other than the one holding the library and applications.

While these embodiments have been described with emphasis on the embodiments, it should be understood that within the scope of the appended claims, the embodiments might be practiced other than as specifically described herein.

What is claimed is:

1. A method for detecting errors in software comprising:
   a. extracting functions from dynamically linked applications;
   b. determining an error return code and an error number for the functions extracted;
   c. forming at least one wrapper using the functions extracted;
   d. executing software, wherein the software intercepts function calls using the wrapper;
   e. manipulating some of the function calls intercepted to fail; and
   f. testing if the dynamically linked applications operate when a failure occurs.

2. The method of claim 1, wherein the error return code and the error number are extracted by parsing a manual page of the functions.

3. The method of claim 1, wherein the error return code and the error number are extracted by a fault injection test method performed on the function intercepted.

4. The method of claim 3, further comprising the step of using a test case generator to form a sequence of tests for a particular function to be tested using the fault injection test.

5. The method of claim 1, wherein the error return code and the error number are used to generate the at least one wrapper.

6. The method of claim 1, wherein the function is all functions from a particular application.

7. The method of claim 1, wherein at least one wrapper comprises a priority higher than the C library.

8. The method of claim 1, wherein the wrapper is automatically generated.

9. A computer program product that controls a processor to perform a method, wherein the computer program product comprises: a first code for executing a C library function to extract error return codes; and a second code for generating a wrapper relative to said function.

10. A wrapper for detecting errors in software, wherein the wrapper comprises instructions to:
    a. track error return codes and error numbers;
    b. track extracted functions from an application;
    c. intercept function calls for the application; and
    d. manipulate intercepted function calls to cause the function calls to fail and determine if the application will operate when failure occurs.

11. An article of manufacture comprising a computer readable medium having stored thereon instructions where instructions comprise:
    a. an extraction module for extracting functions from dynamically linked applications;
    b. a software for compiling error return codes and error numbers for functions;
    c. a wrapper module for forming at least one wrapper with the functions extracted; and
    d. a test means to intercept function calls from an application using at least one wrapper and manipulating the intercepted function calls to fail, and then determine if the application will operate when failure occurs.

12. The article of manufacture of claim 11, further comprising a parsing module.

13. The article of manufacture of claim 11 further comprising a fault injection test means for extracting the error return codes and the error numbers.

14. The article of manufacture of claim 11, wherein the wrapper module comprises error return codes and error numbers.

* * * * *